Figure 1:
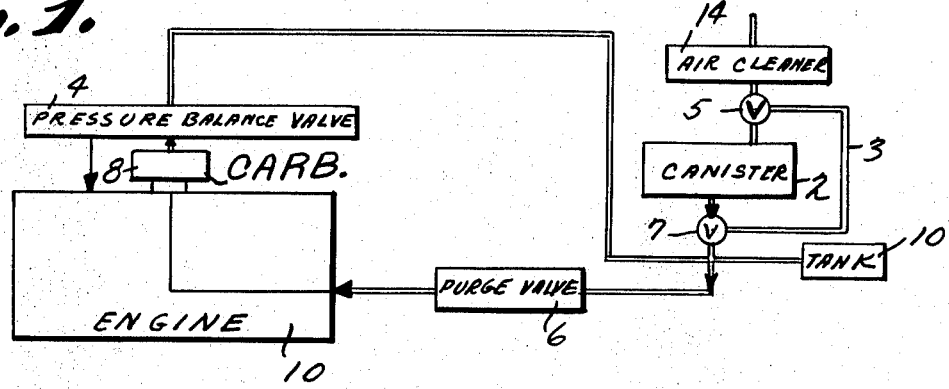

United States Patent

[11] 3,538,896

| [72] | Inventors | George S. Tobias<br>Sewickley;<br>Jonathan C. Cooper, Pittsburgh, and<br>George R. Stoneburner, Coraopolis,<br>Pennsylvania |
|---|---|---|
| [21] | Appl. No. | 810,933 |
| [22] | Filed | March 25, 1969<br>Continuation of Ser. No.<br>639,418, May 18, 1967 |
| [45] | Patented | Nov. 10, 1970 |
| [73] | Assignee | By mesne assignments to, Calgon<br>Corporation, a corporation of Delaware |

[54] PURGING GASOLINE STREAMS EMPLOYING A BYPASS
2 Claims, 2 Drawing Figs.

[52] U.S. Cl. ..................................... 123/136,
123/120
[51] Int. Cl. ..................................... F02m 21/02
[50] Field of Search ........................... 123/119,
120, 121, 136

[56] References Cited
UNITED STATES PATENTS

| 2,315,882 | 4/1943 | Trimble et al. | 123/121 |
|---|---|---|---|
| 2,339,988 | 1/1944 | Gerson et al. | 123/121 |
| 2,358,840 | 9/1944 | Walker | 123/121 |
| 2,443,120 | 6/1948 | Saucier | 123/121 |
| 2,737,937 | 3/1956 | Matthews | 123/121 |
| 2,785,966 | 3/1957 | Rockwell | 48/184 |
| 3,191,587 | 6/1965 | Hall | 123/136 |
| 3,460,522 | 8/1969 | Kittler et al. | 123/136 |

*Primary Examiner*—Laurence M. Goodridge
*Attorney*—Cushman, Darby & Cushman

ABSTRACT: An evaporative loss control device for automobiles is modified to provide a variable purge rate and thereby improve the efficiency of said device. To smooth out the air fuel ratio a bypass of the adsorbing media is provided for a portion of the entering air.

INVENTORS
GEORGE S. TOBIAS
JONATHAN C. COOPER
BY GEORGE R. STONEBURNER

ATTORNEYS

PURGING GASOLINE STREAMS EMPLOYING A BYPASS

This application is a continuation of our copending application Ser. No. 639,418 filed May 18, 1967.

The present invention relates to the use of a fuel vapor recovery system.

The problem of evaporative emissions for automobile fuel systems is one of growing significance to the petroleum and automotive industries. As pointed out in Wentworth U.S. Pat. No. 3,093,124, the smog and pollution problem has directed attention to eliminating gasoline vapors which may escape from the fuel tank and carburetor float bowl. In addition the Motor Vehicle Pollution Control Board of California has proposed standards for the control of the evaporation losses, considering them to represent a sizable contribution to the smog problem. Further interest in controlling evaporative losses has been shown by the U.S. Government with the publication of proposed standards for such losses in the Federal Register.

As part of the means for eliminating the gasoline vapors Wentworth discloses the use of a canister filled with an adsorbent, e.g., activated carbon, for the volatile portions of the gasoline. Gasoline vapors given off by the engine fuel reservoir and the engine carburetor while the engine is not operating are recovered and retained in the canister and are subsequently released during engine operation, conducted to the engine and burned therein. This adsorption is accomplished by using the full flow of the engine air or a partial flow of the engine air through the adsorbent.

As explained in the Esso Research and Engineering Company Paper entitled "An Adsorption—Regeneration Approach to the Problem of Evaporative Control", presented at the Society of Automotive Engineers, Detroit, Michigan, Jan. 13, 1967, the basic evaporative loss control system has three essential components, (1) the canister containing the adsorbent for gasoline vapors, (2) the pressure balance valve, and (3) the purge control valve. The canister traps hydrocarbon vapors before they can escape to the atmosphere and holds them there until such time as they can be sent to the engine. The purpose of the pressure balance valve is to maintain metering forces in the carburetor exactly as they were originally designed while at the same time closing all external vents and routing hydrocarbon vapors from the carburetor bowl to the canister. The vapors from the fuel tank are also permitted to go the the canister. The function of the purge control valve is to allow the stripping of the hydrocarbon from the canister and the consequent feeding of the hydrocarbon laden purge airstream to the intake manifold. This is permitted to take place only under certain modes of engine operation.

Such an evaporative loss control device reduces the evaporative emission losses to the atmosphere. Thus the Motor Vehicle Pollution Control Board of California has proposed the following standards for the control of hydrocarbon evaporation losses—2 grams per hot soak from the carburetor and 6 grams per day from the fuel tank as against normal operating conditions wherein 10 grams of hydrocarbons are lost per hot soak from the carburetor and 30 grams of hydrocarbon are lost per day from the fuel tank. By the use of the ELCD Esso reduced the tank losses to essentially 0 grams per day in three test cars and reduced the carburetor loss per hot soak to 0.9 to 1.4 grams.

In the system described in Wentworth U.S. Pat. No. 3,093,124 the vapors given off of the carburetor float bowl and gasoline tank while the engine is off are captured in an adsorbent canister encircling the exhaust pipe. Each time the car is driven the canister will be heated and the adsorbent material purge off the trapped fuel vapors. In Wentworth U.S. Pat. No. 3,221,724 a fuel vapor recovery system is provided in which a low reactivating temperature adsorbent is used.

When the engine is off, vent lines from the carburetor float bowl and the fuel tank deliver raw gas vapor mixtures to the adsorbent where they are accepted and stored. When the engine is started the air sucked through the air intake and carburetor passes through and around the adsorbent bed bringing it to its reaction temperature, thus driving off the trapped fuel vapors. These vapors are carried off to the combustion chamber of the engine and burned.

The air-to-fuel ratio within the engine is desirably in the range of to 12—16 to 1. At present the problem is that no method has been devised for desorbing the lost hydrocarbon material from the canister containing activated carbon or the like and feeding it back to the intake system for combustion without causing an over-rich air-fuel mixture during the initial portion of the purge cycle. This results in such a rich mixture that engine performance is irregular and poor (i.e., hesitation; stumble) and CO content is increased. This is because of the rapid rate of hydrocarbon release during the first 10 minutes of desorption.

Accordingly it is an object of the present invention to devise and improve methods for desorbing hydrocarbons from the canister of an evaporative loss control device.

Another object is to desorb the volatile hydrocarbons from the evaporative loss control device and send them back to the engine for combustion without causing over richness which would result in a momentary "sag" or poor engine performance which could cause an increase in pollutants such as carbon monoxide in the exhaust.

Still further objects in the entire scope of applicability to the present invention will become apparent from the detailed description given hereinafter. It should be understood, however, that the detailed description and specific examples while indicating preferred embodiments of the invention are given by way of illustration only, since various changes and modifications within the spirit and scope of the invention will become apparent to those skilled in the art from this detailed description.

It has been proposed in Kranc application Ser. No. 632,626, filed Apr. 21, 1967, entitled "Purgine Volatiles from Gasoline Stream" to employ a variable purge rate of the gases adsorbed on the adsorbent, e.g., activated carbon, in the canister as disclosed in Wentworth or in the Esso Paper "An Adsorption Regeneration Approach to the Problem of Evaporative Control" or in other devices of similar character.

The purge rate in the Kranc development can be made either continuously variable, e.g., by the use of mechanical or electrical controlling means or the purge rate can be varied by a plurality of specific incremental steps. Thus there can be 2, 3, 4, 5 or more steps ( a continuously changing purge rate being in effect an infinite number of incremental steps). In most automobiles on the road today when using the Kranc procedure the purge rate should be adjusted so that there is a difference between the beginning and a subsequent purge rate of at least double, e.g., if the initial purge rate is 0.1 cfm. (cubic feet per minute) the subsequent purge rate should be at least 0.2 cfm. and desirably the subsequent purge rate is 3, 5, or 10 times the initial purge rate. Generally the initial purge rate is the lowest and subsequent purge rates are at higher rates of purging air.

The purge rates are adjusted to give as closely as possible a uniform rate of hydrocarbon release during the purge cycle thereby minimizing over-rich conditions during the first stages of purge.

When a plurality of purge rates other than a continuously changing purge rate is employed in the Kranc procedure the change from one purge rate to another is preferably done when the air-to-fuel ratio is between 15:1 and 16:1 although this can be varied.

The present invention is an improvement on the Kranc procedure. According to the present development rather than a variable intake of air, the air intake remains constant, e.g., at 1 cfm. but a variable proportion of the air admitted passes through the adsorbent containing canister. The use of the canister bypass has the advantage of smoothing out the air-to-fuel ratio. In practice, for example, at the start of the purge cycle 14 cfm. of air goes to the carburetor throat, 0.1 cfm. of air goes through the highly laden adsorbent in the canister and 0.9 cfm. of air bypasses the adsorbent. As the purge cycle continues the amount of air going to the carburetor throat remains constant at 14 cfm. but the amount of air going through the adsorbent increases, e.g., to 0.2 cfm. and the amount of air bypassing the adsorbent is dropped to 0.8 cfm. When the amount of air passing through the adsorbent is increased to 1 cfm. the amount of air bypassing the adsorbent is reduced to zero. The relationship between the amount of air going to the carburetor throat and the amount of air going through and bypassing the adsorbent can be adjusted so that the air-to-fuel ratio is correct for the particular engine, e.g., with some engines only 13 cfm. might go to the carburetor throat and 2 cfm. of air might be employed for purging the adsorbent and as bypass or for other engines there might be used 14 cfm. of air for the carburetor throat and 3 cfm. of air for purging the adsorbent and bypass.

The relationship between the air purging the adsorbent and that in the bypass can be made either continuously variable (so that the amount of air in the bypass is gradually reduced), e.g., by the use of mechanical or electrical controlling means or the relationship can be varied by a plurality of incremental steps. Thus there can be 2, 3, 4, 5 or more steps (a continuously varying relationship being in effect an infinite number of incremental steps.) In most automobiles on the road today the ratio of air going through the adsorbent to that going through the bypass is adjusted so that the amount of air initially going through the adsorbent is at least doubled in a subsequent stage of the purge cycle, e.g., if the initial rate of air going through the adsorbent is 0.1 cfm. and the rate of air going through the bypass is 0.9 cfm. the amount of air passing through the adsorbent in a subsequent stage should be at least 0.2 cfm. and the amount of air then going through the bypass is 0.8 cfm. (the total air going through the adsorbent and the bypass being maintained constant). If more than two rates of air passing through the adsorbent are employed the subsequent rates can be 3, 5, or 10 times the initial amount of air passing through the adsorbent with corresponding reduction in the amount of air going through the bypass. An illustrative cycle would be as follows:

| Air to carburetor throat, c.f.m. | Air through adsorbent, c.f.m. | Air through bypass, c.f.m. |
|---|---|---|
| 14 | 0.1 | 0.9 |
| 14 | 0.3 | 0.7 |
| 14 | 0.5 | 0.5 |
| 14 | 1.0 | 0 |

The ratio of air through adsorbent to air through bypass are preferably adjusted to give as closely as possible an overall air-to-fuel ratio to the engine within the desired range of about 12—16 to 1.

The change from one rate of air through the adsorbent to another rate of air through the absorbent is preferably done when the air to fuel ratio is between 15.1 and 16.1 although this can be varied.

Generally the initial amount of air purging the adsorbent is the lowest and the subsequent ratio of air purging the adsorbent are higher while conversely the amount of bypass air initially is the highest and subsequently the amount of bypass air is reduced so that the total air through the adsorbent plus bypass air is constant.

In the following examples the adsorbent employed was Pittsburgh type BPX activated carbon (12 × 40 mesh U.S. Sieve Series) but there can also be used any other conventional activated carbon such as Pittsburgh type BPL (12 × 30 mesh), Pittsburgh type PCB (12 × 30 mesh), Pittsburgh type SGL, Barneby-Cheney (8 × 30 mesh), Nuchar (12 × 30 mesh), Darco (12 × 20 mesh), etc. as well as other adsorbents, e.g., molecular sieves. The preferred adsorbents are activated carbons.

Since the working capacity for different types activated carbons and other adsorbents varies, the purge rate schedule in cfm. employed will be dependent upon the activated carbon. The schedule for any one carbon, however, can be obtained very conveniently, e.g., by saturating the activated carbon with the chosen hydrocarbon gas or mixture of gases and then observing the desorption rate at various rates of air flow through the carbon containing canister.

The rates of air flow can also be adjusted to ensure the desired desorption in any desired purge time, e.g., 5, 10, 15 or 20 minutes. Obviously higher overall air flow rates are required for a purge in a time of 5 minutes than for the same amount of purge in 20 minutes. At average purge times of up to 20 minutes the ELCD is known to function for test cycles of 6 years without noticeable change in activated carbon capacity.

Figure 2:
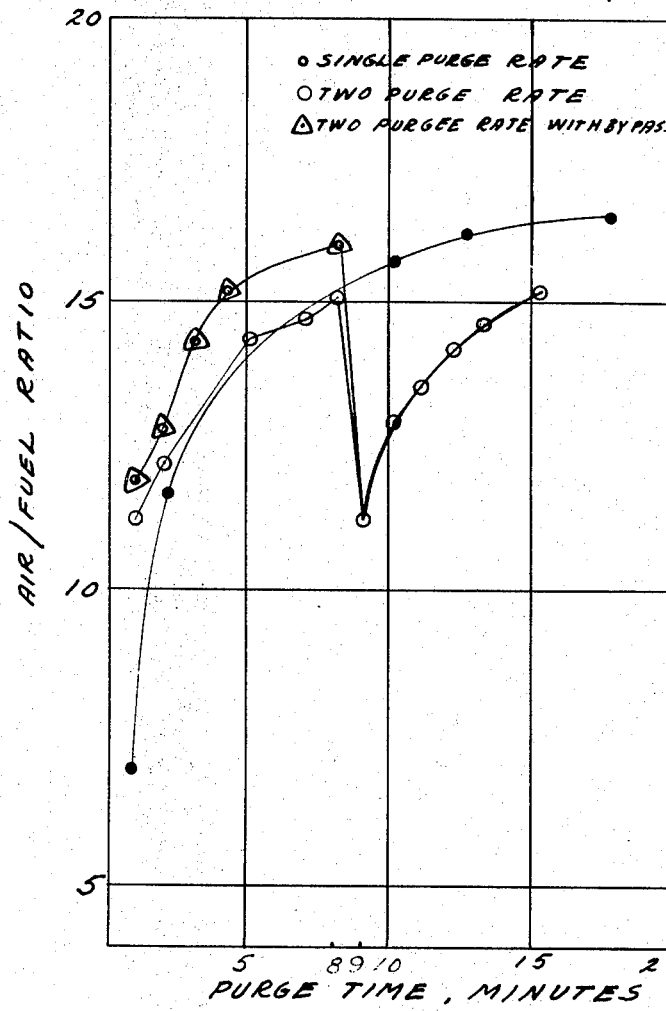

The invention will be understood best in connection with the drawings wherein:

FIG. 1 is a schematic diagram illustrating an evaporative loss control device according to the invention; and FIG. 2 is a graph showing the effect of bypass air on the air-to-fuel ratio.

Referring more specifically to FIG. 1 which shows the fuel vapor recovery system there is provided an evaporative loss control device (ELCD) including a canister 2 containing activated carbon, a bypass line 3, a pressure balance valve 4 and a purge control valve 6. The system also includes the carburetor 9, engine 10, gasoline tank 12 and air cleaner 14.

In the purging condition of the ELCD the hydrocarbon air vapors go in the direction indicated by the arrows, i.e., the hydrocarbons which have been adsorbed on the activated carbon in the canister gradually are desorbed and go through the purge control valve to the engine where they are burned. Gasoline vapor from the fuel tank bypasses the canister and also goes through the purge control valve to the engine intake manifold. Gasoline vapor in the carburetor goes through the pressure balance valve to the engine intake manifold. Air at a controlled but varying rate is brought in from the outside through the air cleaner and then the canister and mixes with the hydrocarbons on the way to the purge control valve.

In the purge cycle the air going through the canister 2 and bypass line 3 is regulated by valve 5, e.g., initially the valve regulates the air so 0.1 cfm. of air goes through the canister and 0.9 cfm. of air goes through bypass line 5 while subsequently in the purge cycle valve 5 is operated so that 1 cfm. of air goes through the canister and no air goes through bypass line 3.

It will be observed that the air going through the canister 2 containing the adsorbent and the air going through the bypass 3 join at point 7 and then proceed together to the engine through purge valve 6.

On the other hand in the hot soak condition, for example, gasoline vapors go from the fuel tank to the canister but cannot go through the purge valve to the engine manifold. Similarly, gasoline vapors go from the carburetor through the pressure balance valve to the canister but are prevented from going to the engine manifold.

The ELCD operation for other conditions of engine mode is also like that set forth in the aforementioned Esso Research and Engineering Company paper.

Unless otherwise indicated all parts and percentages are by weight.

*EXAMPLE 1*

An automobile containing an ELCD without a bypass line had 910 grams of BPX activated carbon in its canister which was saturated with volatile hydrocarbon (butane). The automobile was run at 30 miles per hour. 14.9 cfm. of air was introduced through the carburetor throat and 0.1 cfm. of air was introduced through the canister for the first 8 minutes and then for the next 7 minutes 14.0 cfm. of air were introduced through the carburetor throat and 1 cfm. of air was introduced through the canister. The hydrocarbons were purged at 25°C. The results of operating the car with this double purge rate (Kranc invention) are set forth in table 1.

TABLE 1

| Time (Min.) | Fuel from— | | Total fuel, grams | Air to fuel ratio |
|---|---|---|---|---|
| | Carburetor, grams | Canister, grams | | |
| 1 | 29.6 | 12.7 | 42.3 | 11.2 |
| 2 | 29.6 | 9.4 | 39.0 | 12.2 |
| 3 | 29.6 | 5.4 | 35.0 | 13.6 |
| 4 | 29.6 | 3.6 | 33.2 | 14.3 |
| 5 | 29.6 | 3.6 | 33.2 | 14.3 |
| 6 | 29.6 | 3.0 | 32.6 | 14.6 |
| 7 | 29.6 | 2.7 | 32.3 | 14.7 |
| 8 | 29.6 | 2.1 | 31.7 | 15.1 |
| 9 | 27.7 | 14.8 | 42.5 | 11.2 |
| 10 | 27.7 | 9.1 | 36.8 | 12.9 |
| 11 | 27.7 | 7.6 | 35.3 | 13.5 |
| 12 | 27.7 | 5.7 | 33.4 | 14.2 |
| 13 | 27.7 | 4.6 | 32.3 | 14.7 |
| 14 | 27.7 | 3.7 | 31.4 | 15.2 |
| 15 | 27.7 | 3.9 | 31.6 | 15.1 |

Ultimately when the canister is completely purged the air-to-fuel ratio is 17.2 to 1.

*EXAMPLE 2*

The same automobile as in example 1 containing an ELCD but this time equipped with a bypass line 3 (FIG. 1) has 910 grams of BPX activated carbon in its canister which was saturated with volatile hydrocarbons (butane). The automobile was run at 30 miles per hours. 14 cfm. of air were introduced continually through the carburetor throat during the 15-minute run. 0.1 cfm. was introduced through the canister 2 for the first 8 minutes and 0.9 cfm. of air was introduced via bypass line 3. Then for the next 7 minutes 1 of air was introduced through the canister and no air was introduced through bypass line 3. The hydrocarbons were purged at 25°C. The results of operating the car are set forth in table 2.

TABLE 2

| Time (Min.) | Fuel from— | | Total fuel | Air to fuel ratio |
|---|---|---|---|---|
| | Carburetor | Canister | | |
| 1 | 27.7 | 12.7 | 40.4 | 11.8 |
| 2 | 27.7 | 9.4 | 37.1 | 12.8 |
| 3 | 27.7 | 5.4 | 33.1 | 14.3 |
| 4 | 27.7 | 3.6 | 31.3 | 15.2 |
| 5 | 27.7 | 3.6 | 31.3 | 15.2 |
| 6 | 27.7 | 3.0 | 30.7 | 15.5 |
| 7 | 27.7 | 2.7 | 30.4 | 15.7 |
| 8 | 27.7 | 2.1 | 29.8 | 16.0 |
| 9 | 27.7 | 14.8 | 42.5 | 11.2 |
| 10 | 27.7 | 9.1 | 36.8 | 12.9 |
| 11 | 27.7 | 7.6 | 35.3 | 13.5 |
| 12 | 27.7 | 5.7 | 33.4 | 14.2 |
| 13 | 27.7 | 4.6 | 32.3 | 14.7 |
| 14 | 27.7 | 3.7 | 31.4 | 15.2 |
| 15 | 27.7 | 3.9 | 31.6 | 15.1 |

FIG. 2 is a graph with the air-to-fuel ratio as the ordinate and the purge time in minutes as the abscissa for the 15 minute purge cycle with the automobile set forth in examples 1 and 2. The single rate curve was for an air flow of 1 cfm. through the canister and 14.0 cfm. through the carburetor throat. The two purge rates was for an air flow rate of 0.1 cfm. through the canister and 14.9 cfm. through the carburetor for the first 8 minutes and an air flow rate of 1 cfm. through the canister and 14 cfm. through the carburetor for the next 7 minutes. The two purge rates with bypass curve was for air flow rate of 0.1 cfm. through the canister, an air flow rate of 0.9 cfm. through the bypass and 14 cfm. through the canister for the first 8 minutes and an air flow rate of 1 cfm. through the canister, 0 cfm. through the bypass for the next 7 minutes. The curve for the two purge rates with bypass was not carried beyond 8 minutes since it is identical thereafter with the curve for the two purge rates as can be seen from table 1 and 2.

It can be seen from the graphs that the air-to-fuel ratio reduction in the first 8 minutes is minimized by use of two purge rates (variable purge rate) with a bypass as against the use of two purge rates without a bypass. Thus there is a smoothing out of the air-to-fuel ratio.

The use of the two fuel rates (with or without a bypass) eliminates the very low initial air-to-fuel ratio which occurs with a single fuel rate as can be seen from the graph.

We claim:

1. In a method of recovering fuel vapor from an engine fuel system wherein the fuel vapor is adsorbed on an absorbent and the fuel vapor is desorbed with purging air at a variable purge rate in a purging cycle with the rate initially at its lowest and commencing when the engine is turned on and thereafter increasing to at least double the initial purge rate, and burning the released fuel vapor in the engine to obtain a more uniform desorption than can be obtained by a single purge rate and thereby reducing hesitation and stumble during the initial operation of the engine, the improvement comprising maintaining said variable purge rate by initially passing a first portion of the air through the adsorbent before going to the engine, passing a second portion of air to the engine without ever going through the adsorbent and passing a third portion of air to the engine, bypassing the adsorbent and thereafter increasing the portion of air passing through the adsorbent and reducing the third portion of air to zero during the purging cycle.

2. A method according to claim 1 wherein the adsorbent is activated carbon and the amount of air going through the adsorbent is gradually increased to be sufficient to provide a purge air rate through the adsorbent of at least five time the initial purge air rate through the adsorbent.

UNITED STATES PATENT OFFICE
CERTIFICATE OF CORRECTION

Patent No. 3,538,896    Dated Nov. 10, 1970

Inventor(s) George S. Tobias et al

It is certified that error appears in the above-identified patent and that said Letters Patent are hereby corrected as shown below:

Col. 5, line 30, after "1" there should be inserted --cfm.--

Claim 1, line 2 "absorbent" should be changed to --adsorbent--.

SIGNED AND SEALED
FEB 9 1971

FEB. 9, 1971

(SEAL)
Attest:

Edward M. Fletcher, Jr.
Attesting Officer

WILLIAM E. SCHUYLER, J
Commissioner of Patent